(12) United States Patent
Araki et al.

(10) Patent No.: US 10,990,468 B2
(45) Date of Patent: Apr. 27, 2021

(54) COMPUTING SYSTEM AND ERROR HANDLING METHOD FOR COMPUTING SYSTEM

(71) Applicant: HITACHI, LTD., Tokyo (JP)

(72) Inventors: Akihiko Araki, Tokyo (JP); Masakuni Agetsuma, Tokyo (JP); Sachie Tajima, Tokyo (JP); Takanobu Suzuki, Tokyo (JP); Masanori Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 13 days.

(21) Appl. No.: 16/067,825

(22) PCT Filed: Mar. 14, 2016

(86) PCT No.: PCT/JP2016/057886
§ 371 (c)(1),
(2) Date: Jul. 3, 2018

(87) PCT Pub. No.: WO2017/158666
PCT Pub. Date: Sep. 21, 2017

(65) Prior Publication Data
US 2019/0026179 A1    Jan. 24, 2019

(51) Int. Cl.
*G06F 11/07* (2006.01)
*G06F 11/20* (2006.01)
(Continued)

(52) U.S. Cl.
CPC ...... *G06F 11/0793* (2013.01); *G06F 11/0706* (2013.01); *G06F 11/079* (2013.01);
(Continued)

(58) Field of Classification Search
CPC ............. G06F 11/0793; G06F 11/0751; G06F 11/0766; G06F 11/0781; G06F 11/1438;
(Continued)

(56) References Cited

U.S. PATENT DOCUMENTS 5,303,351 A * 4/1994 Jackowski ............ G06F 13/126
714/43
6,622,260 B1 * 9/2003 Marisetty ............ G06F 11/0724
714/10
(Continued)

FOREIGN PATENT DOCUMENTS

JP        10-021153 A     1/1998
JP     2007-304884 A    11/2007
(Continued)

OTHER PUBLICATIONS

International Search Report of PCT/JP2016/057886 dated Jun. 14, 2016.

*Primary Examiner* — Nadeem Iqbal
(74) *Attorney, Agent, or Firm* — Mattingly & Malur, PC

(57) ABSTRACT

A computing system that can maintain reliability required of a storage program while causing the storage program to operate on an operating system (OS) is provided. A processor of the computing system executes an OS controlling a hardware device and a storage program operating on the OS and using the hardware device via the OS. The OS identifies an error status of the hardware device when receiving a notification of an error that has occurred to the hardware device, and notifies the storage program that operates on the OS of the error status when the error status satisfies a predetermined condition. The storage program determines error handling on the hardware device on the basis of the error status, and requests the OS to perform the determined error handling. The OS performs the determined error handling on the hardware device.

10 Claims, 13 Drawing Sheets

(51) Int. Cl.
*G06F 12/00* (2006.01)
*G06F 11/14* (2006.01)

(52) U.S. Cl.
CPC ...... *G06F 11/0772* (2013.01); *G06F 11/0787* (2013.01); *G06F 11/142* (2013.01); *G06F 12/00* (2013.01); *G06F 11/2038* (2013.01); *G06F 11/2048* (2013.01)

(58) Field of Classification Search
CPC ............ G06F 11/1402; G06F 2201/88; G06F 2221/034; G06F 2221/033
See application file for complete search history.

(56) References Cited

U.S. PATENT DOCUMENTS

| | | | | |
|---|---|---|---|---|
| 7,549,090 | B2* | 6/2009 | Bailey | G06F 11/0745 714/43 |
| 7,661,020 | B1* | 2/2010 | Coatney | G06F 11/1084 714/6.32 |
| 7,904,751 | B2* | 3/2011 | Marisetty | G06F 11/0724 714/10 |
| 8,839,032 | B2* | 9/2014 | Walton | G06F 11/0712 709/224 |
| 9,218,246 | B2* | 12/2015 | Nagesharao | G06F 11/1415 |
| 2008/0010483 | A1 | 1/2008 | Kuroishi et al. | |
| 2008/0010506 | A1* | 1/2008 | Tabei | G06F 11/0724 714/6.12 |
| 2008/0028264 | A1* | 1/2008 | Kerner | G11B 27/36 714/42 |
| 2010/0251014 | A1 | 9/2010 | Yagi | |
| 2012/0079312 | A1* | 3/2012 | Muthrasanallur | G06F 11/0793 714/5.1 |
| 2015/0268882 | A1 | 9/2015 | Usuda et al. | |

FOREIGN PATENT DOCUMENTS

| | | |
|---|---|---|
| JP | 2010-072966 A | 4/2010 |
| JP | 2010-231340 A | 10/2010 |
| JP | 2015-184925 A | 10/2015 |

* cited by examiner

BYPASS CONDITION TABLE

| HARDWARE DEVICE (3240) | BYPASS CONDITION (ERROR TYPE: NUMBER OF OCCURRENCES OF ERRORS) (3241) |
|---|---|
| HOST INTERFACE | Uncorrected Fatal:1 |
| DISK INTERFACE | Uncorrected Fatal:1 |
| SERVER-TO-SERVER INTERCONNECT | Uncorrected Fatal:1<br>Uncorrected Non-Fatal:4<br>Correctable:64 |
| MANAGEMENT INTERFACE | No |
| BMC | Uncorrected Fatal:1 |

BLOCKING ACTION TABLE

| BLOCKED DEVICE (3250) | BLOCKING-TIME ADDED ACTION (3251) |
|---|---|
| HOST INTERFACE | NONE |
| DISK INTERFACE | NONE |
| SERVER-TO-SERVER INTERCONNECT | DETERMINATION AND ARBITRATION OF RESIDUAL NODE DURING BLOCK OF ALL SERVER-TO-SERVER INTERCONNECTS |
| MANAGEMENT INTERFACE | NONE |
| BMC | STOP NODE |

HARDWARE USE TABLE

| HARDWARE IDENTIFIER | USE | HARDWARE DEVICE NAME |
|---|---|---|
| bus0,device1,function0 | HOST INTERFACE | HOST INTERFACE 1 |
| bus0,device1,function2 | HOST INTERFACE | HOST INTERFACE 2 |
| bus1,device0,function0 | DISK INTERFACE | DISK INTERFACE 1 |
| bus1,device1,function0 | DISK INTERFACE | DISK INTERFACE 2 |
| bus1,device1,function1 | SERVER-TO-SERVER INTERCONNECT | SERVER-TO-SERVER INTERCONNECT 1 |
| bus1,device2,function1 | MANAGEMENT INTERFACE | MANAGEMENT INTERFACE 1 |
| bus1,device2,function4 | BMC | BMC1 |

INTERNAL STATE TABLE

| HARDWARE DEVICE NAME | INTERNAL STATE |
|---|---|
| HOST INTERFACE 1 | NORMAL |
| HOST INTERFACE 2 | INTERNALLY BLOCKED |
| DISK INTERFACE 1 | NORMAL |
| DISK INTERFACE 2 | NORMAL |
| SERVER-TO-SERVER INTERCONNECT 1 | NORMAL |
| MANAGEMENT INTERFACE 1 | NORMAL |
| BMC1 | NORMAL |

FIG.9

| INTERRUPT VECTOR NUMBER (INTERRUPT TYPE) | INTERRUPT HANDLER |
|---|---|
| XX (HARDWARE DEVICE ERROR NOTIFICATION) | ERROR IDENTIFICATION SECTION 211, ERROR STATUS DETERMINATION SECTION 212 |

INTERRUPT MANAGEMENT TABLE

FIG.10

| ERROR OCCURRENCE LOCATION | ERROR CONTENT |
|---|---|
| bus1,device0,function0 | Uncorrected Fatal |

ERROR OCCURRENCE INFORMATION

FIG.11

| HARDWARE DEVICE | ERROR HISTORY (ERROR TYPE: NUMBER OF OCCURRENCE OF ERRORS) |
|---|---|
| DISK INTERFACE 1 | Correctable:22 |
| SERVER-TO-SERVER INTERCONNECT 1 | Uncorrected Non-Fatal:1 Correctable:8 |

ERROR HISTORY INFORMATION

| OPERATION MODE | I/O PROCESS OR FAILURE PROCESS |

OPERATION MODE SWITCH TABLE

ERROR LOG 1    3280    3281

| DATE | LOG CONTENT |
|---|---|
| AAAAAA | ERROR NOTIFICATION RECEPTION TARGET HARDWARE DEVICE NAME ERROR TYPE |
| BBBBBBB | RESET OF TARGET HARDWARE DEVICE X |
| CCCCCCC | SUCCESSFUL RECOVERY |

ERROR LOG 2    3280    3281

| DATE | LOG CONTENT |
|---|---|
| AAAAAA | ERROR NOTIFICATION RECEPTION TARGET HARDWARE DEVICE NAME ERROR TYPE |
| BBBBBBB | BLOCK OF TARGET HARDWARE DEVICE Y BY STORAGE PROGRAM |

ERROR LOG INFORMATION

COMPUTING SYSTEM AND ERROR HANDLING METHOD FOR COMPUTING SYSTEM

TECHNICAL FIELD

The present invention relates to a computing system and an error handling method for a computing system.

BACKGROUND ART

There is known JP-2010-231340-A (Patent Document 1) as a document disclosing background art of the present technique. Patent Document 1 describes a technique for performing hardware device error handling by a BIOS (basic input output system) or an OS (operating system) at a time of occurrence of an error to a hardware device on a server.

PRIOR ART DOCUMENT

Patent Document

Patent Document 1: JP-2010-231340-A

SUMMARY OF THE INVENTION

Problem to be Solved by the Invention

Generally, high reliability is required of a storage device. To enhance reliability, the storage device is connected to other storage devices or a plurality of storage controllers within the storage devices are mutually connected, thereby enhancing redundancy. In this way, each storage device needs to be connected to a plurality of devices or controllers, and interfaces corresponding to uses are provided. These interfaces are each normally realized by hardware. At a time of occurrence of an error to the hardware, it is desirable to execute error handling in accordance with an error type or the use of the interface.

Furthermore, attention has been given to a technique for actuating a storage program on a general-purpose server and realizing a storage function for the purpose of containment of costs and the like related to procurement of expensive storage devices. New demand arises accordingly for actuating the storage program on a general-purpose OS that is provided in the general-purpose server and that is capable of controlling hardware devices such as the interfaces, as a method of realizing the storage function while using a function of the general-purpose OS. In this case, similarly to the former case, high reliability is required of the storage program as a storage.

However, the general-purpose OS executes ordinary error handling on the general-purpose server and this general-purpose OS often lacks an error handling mechanism depending on differences in use among the hardware devices. Owing to this, when the storage function is realized on the general-purpose server, then an error handling capability of the storage function differs from that of a conventional storage, and it is often unlikely to maintain high reliability. It is supposed, for example, that an error has occurred to one hardware device. Even if the error is a grave error for which the storage is required to block and stop using the hardware device, the error handling by the general-purpose OS possibly allows continuation to use the hardware device.

In this way, when the storage program is actuated on the OS, then the storage program is unable to exercise direct control over the hardware devices, and the error handling on the hardware devices is executed by the OS or the BIOS capable of controlling the hardware devices, with the result that it is often unlikely to maintain the reliability required of the storage. In this regard, Patent Document 1, for example, does not suppose actuating the storage program on the OS and does mention a technique for maintaining the reliability required of the storage program.

Therefore, the present invention provides a computing system that can maintain reliability required of a storage program while actuating the storage program on an OS.

Means for Solving the Problem

To solve the problem, a computing system according to one aspect of the present invention includes: a processor that executes an operating system controlling a hardware device and a storage program operating on the operating system and using the hardware device via the operating system; and a memory that records condition management information managing a predetermined condition on which the storage program determines error handling on the hardware device. The operating system identifies an error status of the hardware device when receiving a notification of an error that has occurred to the hardware device, and notifies the storage program operating on the operating system of the error status when the error status satisfies the predetermined condition. The storage program determines the error handling on the hardware device on the basis of the error status, and requests the operating system to perform the determined error handling. The operating system performs the determined error handling on the hardware device.

Effect of the Invention

According to the present invention, it is possible to provide a computing system that can maintain reliability required of a storage program while actuating the storage program on an OS. Objects other than the abovementioned object, configurations, and effects will be readily apparent from the description of an embodiment given below.

BRIEF DESCRIPTION OF THE DRAWINGS

FIG. 5 shows a configuration of a bypass condition table.

FIG. 6 shows a configuration of a blocking action table.

FIG. 7 shows a configuration of a hardware use table.

FIG. 8 shows a configuration of an internal state table.

FIG. 9 shows a configuration of an interrupt management table.

FIG. 10 shows a configuration of error occurrence information.

FIG. 11 shows a configuration of error history information.

FIG. 12 shows a configuration of an operation mode switch table.

FIG. 13 shows a configuration of error log information.

MODES FOR CARRYING OUT THE INVENTION

An embodiment of the present invention will be described hereinafter with reference to the drawings. For clarity of description, omissions and simplification are made as appropriate in the following description and drawings. The present invention is not limited to the present embodiment and a technical scope of the present invention encompasses all application examples that match a spirit of the present invention. Unless specified otherwise, each constituent element may be used either singularly or plurally.

Figure 1:
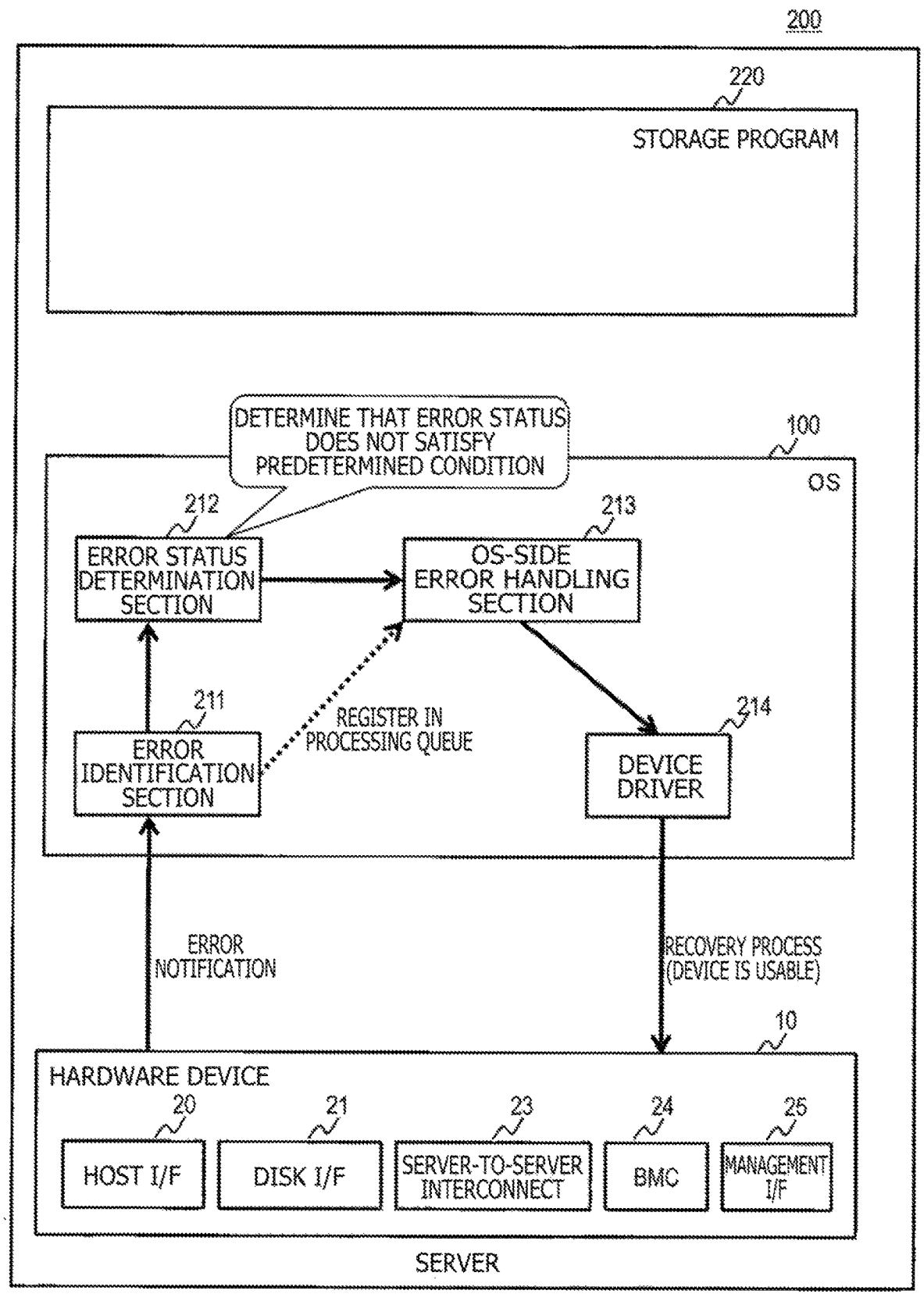
FIG. 1 is a schematic diagram showing operation when an OS executes OS-side error handling.
Figure 2:
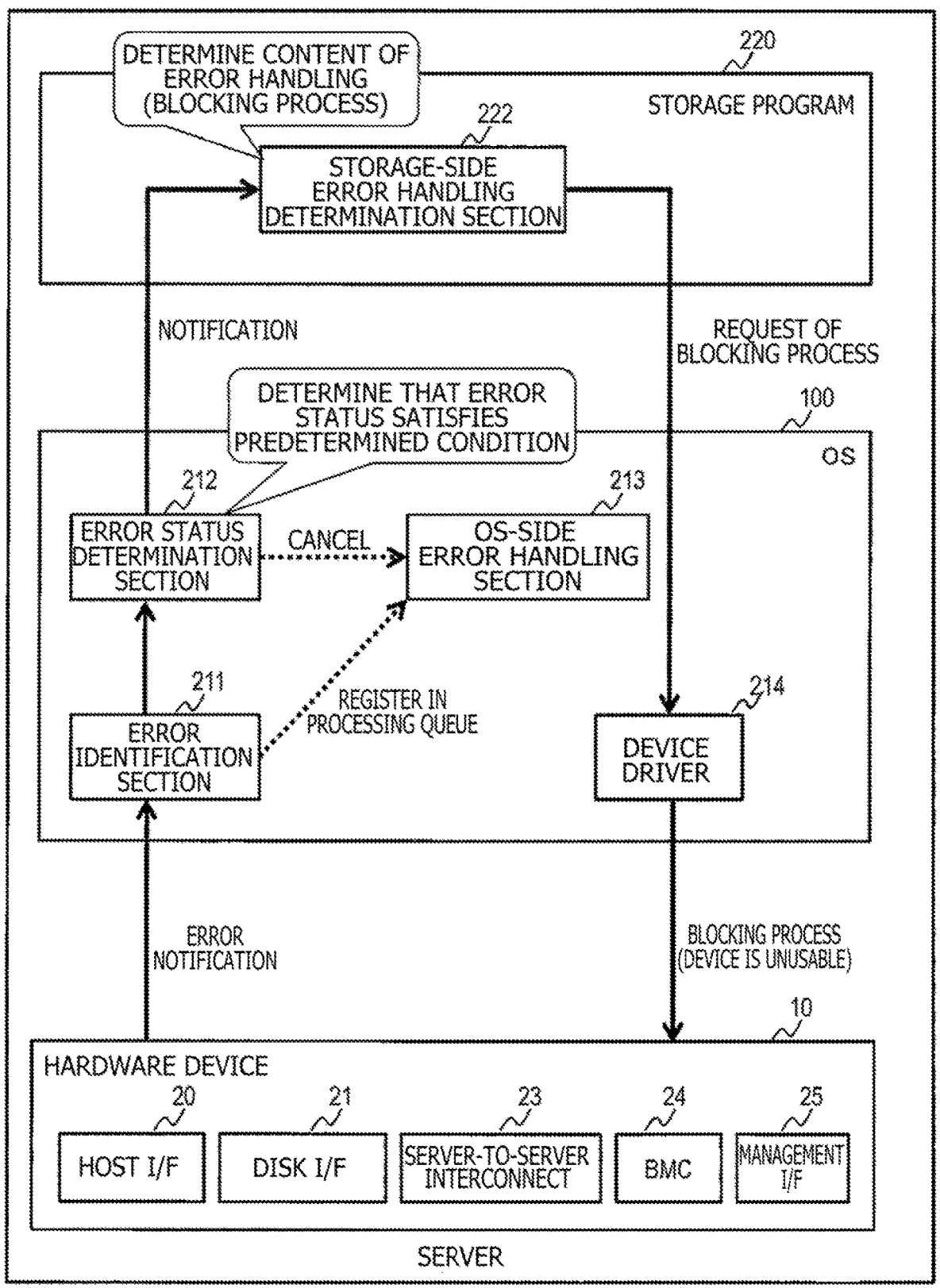
FIG. 2 is a schematic diagram showing operation when a storage program determines error handling on a hardware device to which an error has occurred.

FIGS. 1 and 2 are schematic diagrams showing an example of error handling in the present embodiment. A server 200 has hardware devices 10 and a processor 12 that executes an operating system (OS) 100 and a storage program 220 controlling the hardware devices 10. The storage program 220 operates on the OS 100 and uses the hardware device 10 via the OS 100. The storage program 220 is, for example, a program such as a user process that runs on the OS. Examples of the hardware devices 10 include a host interface (I/F) 20, a disk I/F 21, a server-to-server interconnect 23, a BMC (base board management controller), and a management I/F 25.

The OS 100 includes an error identification section 211, an error status determination section 212, an OS-side error handling section 213, and a device driver 214. The error identification section 211 is an interrupt handler and may be also referred to as "first interrupt handler." Likewise, the error status determination section 212 is an interrupt handler, and the error status determination section 212 may be also referred to as "second interrupt handler" or "bypass handler."

Among the constituent elements of the OS 100, the error identification section 211, the OS-side error handling section 213, and the device driver 214 may be, for example, programs included in a general-purpose OS.

On the other hand, the error status determination section 212 is a program added to the OS 100 in response to a request from the storage program 220 when the storage program 220 is activated. Error handling on each hardware device 10 is normally executed by the OS 100 that controls the hardware device 10. The storage program 220 can, nevertheless, determine a content of the error handling since the error status determination section 212 notifies the storage program 220 of an error on a predetermined condition.

In other words, although the OS 100 has the error identification section 211 activated at a time of occurrence of an error to the hardware device 10, the OS-side error handling section 213 capable of executing the error handling, and the device driver 214 controlling the hardware device 10, the storage program 220 operating on the OS 100 and using the hardware devices 10 via the OS 100 can determine the content of the error handling on the predetermined condition. Therefore, setting the predetermined condition and the content of the error handling determined by the storage program on the basis of, for example, a stricter storage standard than an error handling standard of the general-purpose OS makes it possible to maintain high reliability required of a storage even if the storage program 220 is actuated on the general-purpose OS. Details of a process for adding the error status determination section 212 to the OS 100 will be described later with reference to FIG. 14.

The storage program 220 includes an I/O processing section 221 that processes a read/write request (I/O request) issued by a host (host computer) 30, and a storage-side error handling determination section 222. The storage-side error handling determination section 222 is a processing program called by the error status determination section 212 either directly or indirectly.

FIG. 1 is a schematic diagram showing operation when the OS 100 executes OS-side error handling.

At a time of occurrence of an error to one of the hardware devices 10, the processor 12 receives a notification of the error that has occurred to the hardware device 10 by an error interrupt from the hardware device 10.

The processor 12 executes the error identification section 211, which is the interrupt handler, in the OS 100 and notifies the error identification section 211 of the error. When receiving a notification of the error that has occurred to the hardware device, the error identification section 211 in the OS 100 identifies an error status of the hardware device 10. The error status may be an error occurrence location, an error content, or an error history of the error occurrence location. The error identification section 211 registers the OS-side error handling that is the error handling performed by the OS 100 in a processing queue 312 of the OS 100. It is noted that the processing queue 312 is a queue for management of processes planned to be executed by the OS 100 and is present in a memory 11.

When the error identification section 211 is completed with a process, the processor 12 executes the error status determination section 212 that is the interrupt handler executed preferentially over the OS-side error handling registered in the processing queue 312. A setting of executing the error status determination section 212 subsequently to execution of the error identification section 211 in this way will be described later with reference to FIG. 14.

The error status determination section 212 determines whether the error status satisfies the predetermined condition while referring to a bypass condition table 324. This predetermined condition is the condition on which the storage program 220 determines the error handling on the hardware device 10. Condition management information that manages this predetermined condition is the bypass condition table 324, which is recorded in the memory 11.

FIG. 1 shows an example of a case in which the error status determination section 212 determines that the error status does not satisfy the predetermined condition, and the error status determination section 212 is completed with the process.

The processor 12 then executes the OS-side error handling section 213 for performing the OS-side error handling registered in the processing queue 312.

The OS-side error handling section 213 determines error handling on the hardware device 10 to which the error has occurred. An example of this error handling is a recovery process such as a reset process on the hardware device 10. The OS-side error handling section 213 requests the device driver 214 to execute the determined error handling.

The processor 12 executes the device driver 214 to cause the device driver 214 to perform the error handling determined by the OS-side error handling section 213 on the hardware device 10. The device driver 214 performs, for example, the recovery process on the hardware device 10, thereby enabling the hardware device 10 to be continuously used.

FIG. 2 is a schematic diagram showing operation when the storage program 220 determines the content of the error handling on the hardware device 10 to which the error has occurred. The notification of the processor 12 of the error and the process performed by the error identification section 211 at the time of occurrence of the error to the hardware device 10 are similar to those described with reference to FIG. 1; thus, description thereof will be omitted. Description will be started at the process performed by the error status determination section 212.

FIG. 2 shows an example of a case in which the error status determination section 212 determines that the error status satisfies the predetermined condition as a result of determination as to whether the error status satisfies the predetermined condition. The error status determination section 212 cancels the OS-side error handling registered in the processing queue 312. The OS-side error handling can be canceled before being executed in this way because the error status determination section 212 is executed subsequently to the execution of the error identification section 211 that registers the OS-side error handling in the processing queue 312.

The error status determination section 212 records information about the error status (for example, error occurrence information 311) in an area of the memory 11 to which the storage program 220 can refer, and notifies the storage-side error handling determination section 222 in the storage program 220 of the error status. The error status determination section 212 registers storage-side error handling in the processing queue 312.

The processor 12 then executes the storage-side error handling determination section 222 in the storage program 220 operating on the OS 100 for performing the storage-side error handling registered in the processing queue 312.

The storage-side error handling determination section 222 determines error handling on the hardware device on the basis of the error status while referring to the information about the error status (for example, the error occurrence information 311) recorded in the memory 11. The error handling is, for example, a blocking process on the hardware device to which the error has occurred. It is noted that the storage-side error handling determination section 222 may determine and execute, as the error handling, not only the blocking process but also processes including suspension of the I/O process on the hardware device 10 to which the error has occurred, a blocking-time additional action shown in FIG. 6, and internal blocking by the storage program 220.

The storage-side error handling determination section 222 requests the device driver 214 in the OS 100 to perform the determined error handling. For example, the storage-side error handling determination section 222 issues a request to the device driver 214 to perform a blocking process on (an instruction to the device driver 214 to block) the hardware device to which the error has occurred.

The device driver 214 in the OS 100 performs the error handling determined by the storage-side error handling determination section 222 on the hardware device 10 to which the error has occurred. For example, the device driver 214 prohibits the hardware device 10 from being used and stops the hardware device 10 by performing the blocking process on the hardware device 10.

For example, the error handling performed by the OS 100 possibly allows continuation to use the hardware device 10 until the hardware device 10 fails and becomes unusable, irrespectively of an error type and the number of occurrences of errors. For example, the OS-side error handling by the general-purpose OS resets and reuses the hardware device 10 even if an error that is Uncorrected Fatal has occurred to the hardware device 10.

The handling shown in FIG. 2, by contrast, defines an error type and a threshold for the number of occurrences of errors as the predetermined condition, and allows the storage-side error handling determination section 222 to determine the blocking process on the hardware device 10 to which the error has occurred when the predetermined condition such as occurrence of the error that is Uncorrected Fatal is satisfied. The device driver 214 performs the blocking process on the hardware device 10 to prohibit the hardware device 10 from being used; thus, it is possible to maintain reliability required of the storage program.

Figure 3:
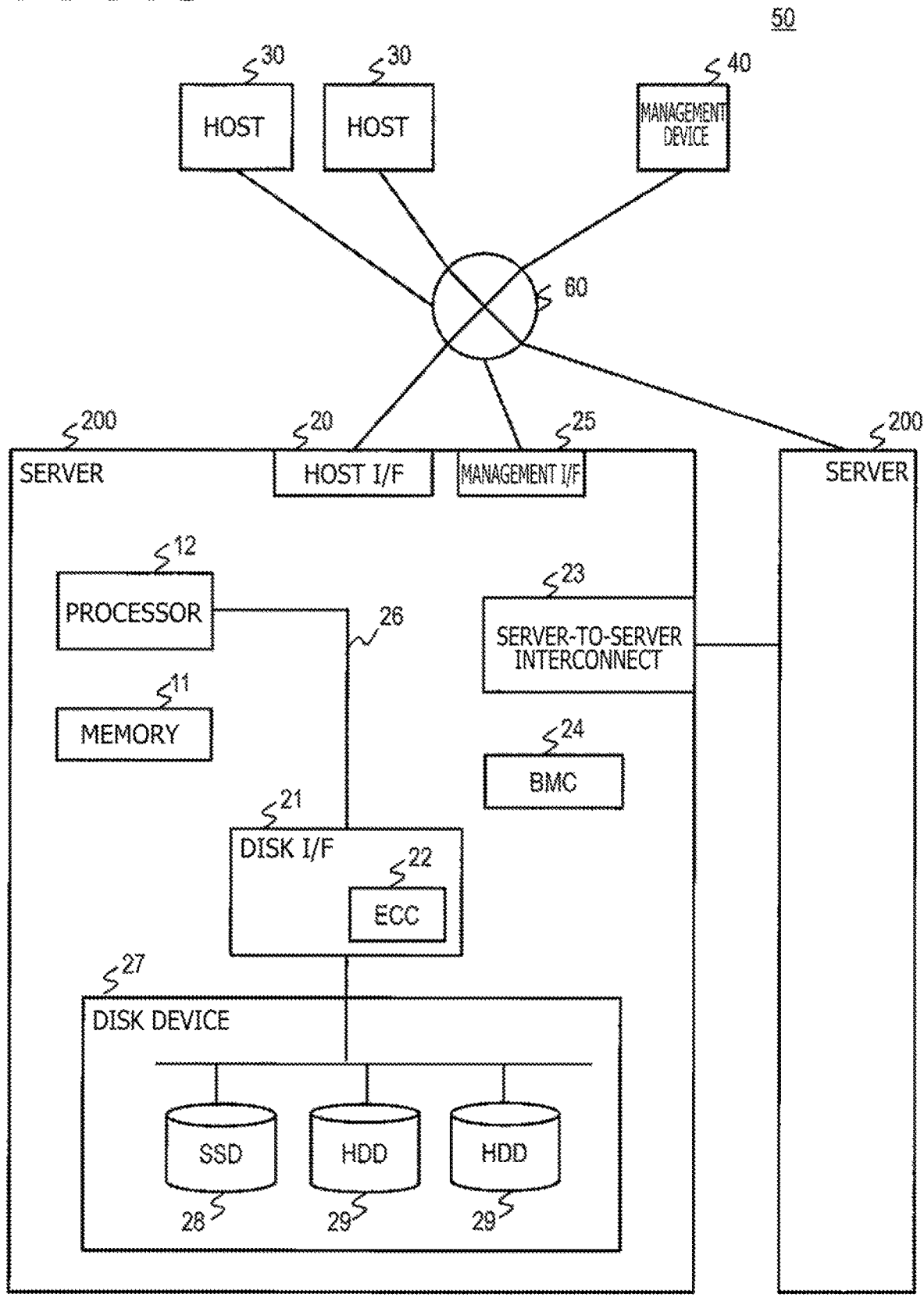
FIG. 3 shows an example of a configuration of a computing system.

FIG. 3 shows an example of a configuration of a computing system 50. The computing system 50 has one or a plurality of servers 200, one or a plurality of hosts 30, and a management device 40. The server 200, the host 30, and the management device 40 are mutually connected by a network 60.

The server 200 holds data communication with the host 30 and the management device 40. For example, the server 200 receives an I/O request from one host 30 via the network 60, executes an I/O process in response to the I/O request, and then sends a process result (I/O response) back to the host 30. The server 200 may be a system that is configured not with one computer but with a plurality of computers.

A management system can be configured with one or a plurality of computers. For example, if a management computer processes and displays information, the management computer serves as the management system. For example, if the plurality of computers realize an equivalent function to that of the management computer, the plurality of computers (which may include a display computer when displaying the information) serve as the management system. In the present embodiment, the management device 40 serves as the management system.

The management device 40 is the management computer that manages software and various settings of the server 200. The management device 40 stores a management program and performs various processes related to management of the server 200 by executing the management program.

A form of the network 60 does not matter as long as the network 60 is a communication network. Examples of the network 60 include the Internet, a LAN (local area network), a WAN (wide area network), a SAN (storage area network), a wireless LAN, and a cellular telephone communication network. Alternatively, the network 60 may be configured with not the single communication network but a plurality of types of communication networks.

For example, a general-purpose computer is supposed as the host 30. Alternatively, the host 30 may be configured with not the single device but a plurality of different computers.

While the server 200 is exemplarily shown as an example of the computer in the present embodiment, the present invention is not limited to this example. As another example, a storage system may be used as the server 200. In the present embodiment, the server 200 may be the computer, a computing system, the storage system, a storage device, or a node.

The server 200 has the memory 11, the processor 12, the hardware devices 10, and disk devices 27, which are connected to one another by a bus 26 or the like. Examples of the hardware devices 10 include the host I/F 20 connected to the host 30 via the network 60, the management I/F 25 connected to the management device 40 via the network 60, the disk I/F 21 connected to the processor 12 via the bus 26 and serving as an I/F of the disk devices 27, the BMC 24, and the server-to-server interconnect 23.

The disk I/F 21 includes an ECC (error correcting code) circuit 22 for an ECC process for detecting and correcting an error during reception of data.

Examples of the hardware devices 10 may include general-purpose hardware mounted in an ordinary server. For example, examples of the hardware device 10 may include storage mediums such as a CPU, a chip set, a memory, an I/O device, and an HDD (hard disk drive).

The server-to-server interconnect 23 is an interface connecting the server 200 to another server 200. The server-to-server interconnect is used in uses including one for retaining a copy of data received from the host 30 in another server 200, and can achieve a more reliable data protection mechanism and enhance redundancy. Furthermore, the storage programs 220 mutually communicate process contents with each other via the server-to-server interconnects 23, thereby making it possible to enhance processing capabilities of the storage programs 220. Moreover, it is possible to carry out mutual monitoring and a failover process for causing another server 200 to continue processes of one server 200 when a failure occurs to the one server 200 by heartbeat communication or the like between the storage programs 220 or OS kernels 210 via the server-to-server interconnects 23.

The processor 12 may have CPU cores that are a plurality of computing units. The CPU cores can operate independently of one another and execute a computer program in parallel. The CPU cores may be referred to as "processor 12."

The memory 11 stores the computer program and other data. Examples of the memory 11 may include a cache that temporarily stores data received from the host 30 and data to be transmitted to the host 30. Another type of storage resources may be adopted as an alternative to or in addition to the memory 11.

The server 200 has, as the disk devices 27, an SSD (solid state drive) 28 and an HDD (hard disk drive) 29 each of which is a secondary storage device of the server 200. The secondary storage device serves as a storage and stores data on the I/O process. The numbers of the SSDs 28 and the HDDs 29 are not limited to specific numbers and are not limited to the numbers shown in FIG. 3. Furthermore, the disk devices 27 are typically the SSD 28 or the HDD 29; however, the disk devices 27 may be arbitrary devices that can store block type data. While the disk devices 27 are exemplarily shown as an example of storage devices in the present embodiment, the present invention is not limited to this example. As another example, the disk devices 27 may be devices each provided with a data archive or an optical disk library such as a DVD, a CD, or the like. The SSD 28 and the HDD 29 are generically referred to as "disk devices 27," hereinafter. In the present embodiment, the disk devices 27 may be the storage devices.

Figure 4:
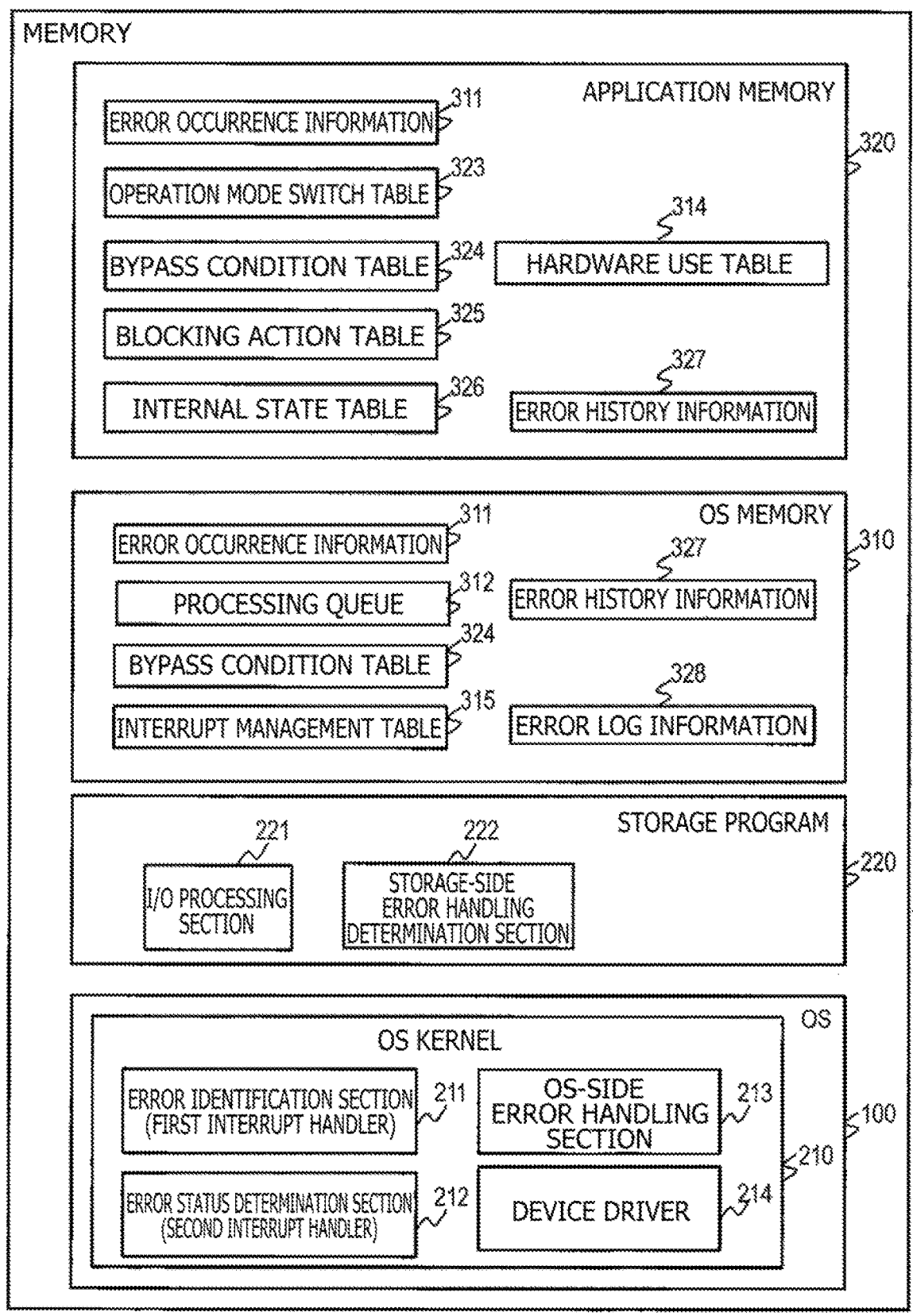
FIG. 4 shows a configuration of a memory in a server.

FIG. 4 shows a configuration of the memory 11 in the server 200. An area of the memory 11 is logically divided and FIG. 4 shows typical information and programs stored in each area. The memory 11 records the OS 100 and the storage program 220. The OS 100 has the OS kernel 210. The storage program 220 has the I/O processing section 221 and the storage-side error handling determination section 222.

The OS kernel 210 has the error identification section 211, the error status determination section 212, the OS-side error handling section 213, and the device driver 214. The error identification section 211 may be referred to as "first interrupt handler." The error status determination section 212 may be referred to as "second interrupt handler." Furthermore, different programs may be implemented depending on uses and types of the hardware devices as the error identification section 211, the error status determination section 212, the OS-side error handling section 213, and the device driver 214. It is noted that a part of or all of processes performed by the OS-side error handling section 213 may be executed by the device driver 214.

A part of the area of the memory 11 is divided into an OS memory 310 that is a first memory area referred to and subjected to information update by the OS kernel 210, and an application memory 320 that is a second memory area referred to and subjected to information update by the storage program 220. It is noted that division means may be either means for physically dividing the area into different memories or means for logically dividing the area. Furthermore, the memory 11 may have a shared memory area which both the OS kernel 210 and the storage program 220 can refer to and update.

The OS memory 310 records the error occurrence information 311, the processing queue 312, the bypass condition table 324, an interrupt management table 315, error history information 327, and error log information 328. Furthermore, the application memory 320 records the error occurrence information 311, an operation mode switch table 323, the bypass condition table 324, a blocking action table 325, an internal state table 326, a hardware use table 314, and the error history information 327.

FIG. 5 shows a configuration of the bypass condition table 324. The bypass condition table 324 is the condition management information that manages the predetermined condition on which the storage program 220 determines the error handling on the hardware device 10. The bypass condition table 324 may be also referred to as "condition management information." In an example shown in FIG. 5, the bypass condition table 324 manages the threshold for the number of occurrences of errors for every error type of errors that have occurred to the hardware devices 10 as the predetermined condition. The bypass condition table 324 is a table in which a condition is described for determining whether the error status determination section 212 passes the handling to the OS-side error handling section 213 or passes the handling to the storage-side error handling determination section 222.

In the present embodiment, at a time of occurrence of an error to one of the hardware devices 10 and determination by the storage-side error handling determination section 222 as to the content of the error handling, the hardware device 10 to which the error has occurred is blocked. Specifically, blocking the hardware device means stopping using the hardware device and yet stopping the hardware device.

The bypass condition table 324 stores the use or the type of each hardware device 10 mounted in the server 200 (hardware device 3240) and an error content as a bypassing condition (bypass condition 3241). The error content may be, for example, the error type and the number of occurrences of errors. Examples of the error type may include Corrected (or Correctable) indicating that an error occurred to one hardware device 10 but the error could be corrected in the hardware device, and Uncorrected (or Uncorrectable) indicating that the error could not be corrected in the hardware device. In addition, Uncorrected is further classified into Non-Fatal and Fatal in a PCI standard, for example, and the present embodiment will be described using the types of error; however, a content of the bypass condition table is not limited to the PCI standard.

An example in which the error type is Corrected is an error in data which is detected and corrected by an ECC circuit 22 provided in the disk interface 21 that is the hardware device 10. In this case, the processor 12 is notified of the error although the error in the data is already corrected.

An example in which the error type is Uncorrected Non-Fatal is an error in data which is detected in the hardware device 10, which cannot be corrected in the hardware device 10, but which can be handled normally by retransmitting the data from a data source.

An example in which the error type is Uncorrected Fatal is an error which is a failure occurring to a communication line (link) between the processor 12 and one of the hardware device 10 and the processor 12 and the hardware device 10 are in an incommunicable state. In this case, the processor 12 and the hardware device 10 possibly turn into a communicable state by resetting the target hardware device and resetting the communication line (link).

However, the resetting does not guarantee that the hardware device 10 to which this Uncorrected Fatal error has occurred turns into the communicable state but the hardware device 10 is possibly broken. Furthermore, Uncorrected Fatal errors tend to occur to the hardware device 10 to which one Uncorrected Fatal error has occurred and the hardware device 10 is possibly necessary to reset many times. In such a status, the hardware device 10 turns into an unstable state, which possibly causes deterioration of storage reliability such as an adverse influence on continuity of work conducted by the host 30. Therefore, according to the bypass condition table 324 in the present embodiment, when one Uncorrected Fatal error occurred to, for example, the host interface 20 connected to the host 30, the error status determination section 212 notifies the storage-side error handling determination section 222 of the error for blocking the host interface 20.

The error types may be classified into Recoverable and Unrecoverable indicating whether the hardware device 10 is recoverable in addition to the classification by whether the hardware device 10 is correctable.

A setting content of the bypass condition table 324 may be provided in the storage program 220 in advance or may be changed in accordance with a request from the management device 40 while the storage program 220 is running.

The bypass condition table 324 may describe conditions for different error types with respect to the same region. For example, according to the bypass condition table 324 in the present embodiment, when one Uncorrected Fatal error occurred, four Uncorrected Non-Fatal errors occurred, or 64 Correctable errors occurred to a region of the server-to-server interconnect, the error status determination section 212 notifies the storage-side error handling determination section 222 of the occurrence or occurrences to pass the handling to the storage-side error handling determination section 222.

At a time of occurrence of the Uncorrected Fatal error (that is, Uncorrectable error that is Fatal) to one hardware device 10 used in the I/O process executed by the storage program 220, then the error status satisfies the predetermined condition managed by the bypass condition table 324, and the storage program 220 determines the error handling. It is noted that the error handling determined by the storage program is the blocking process on the hardware device 10 used in the I/O process executed by the storage program 220.

FIG. 6 shows a configuration of the blocking action table 325. The blocking action table 325 is a table that manages a process (blocking-time additional action 3251) determined by the storage-side error handling determination section 222 to be carried out together with blocking of the failed hardware device when the handling is passed to the storage-side error handling determination section 222. The blocking action table 325 is information that manages each device to be blocked (blocked device 3250) and the blocking-time additional action 3251 to be associated with each other.

According to the blocking action table 325, the storage-side error handling determination section 222 does not need to particularly perform an additional process when blocking, for example, the host interface 20; however, the storage-side error handling determination section 222 performs a residual node determination/arbitration process as the blocking-time additional action 3251 when blocking the server-to-server interconnect 23. The latter case corresponds to a case in which, for example, a plurality of servers 200 are mutually connected to have a redundant configuration. When mutual connection of the servers 200 is closed, it is often desirable that only one of the servers 200 remains active and the other server 200 is inactivated. In preparation for such a case, it is necessary to register an arbitration process for determining a residual node in advance when the server-to-server interconnects 23 are blocked. It is noted that the residual node determination/arbitration process itself may employ an ordinary scheme. Furthermore, when a plurality of server-to-server interconnects 23 are present, it is necessary to perform the residual node determination/arbitration process for the first time when all the server-to-server interconnects 23 are blocked.

Furthermore, according to the blocking action table 325, when the BMC 24 or an interface for connecting the BMC 24 is blocked, the storage-side error handling determination section 222 executes a process for stopping the node as the blocking-time additional action 3251. A reason for execution is as follows. There is normally known a mechanism in which the BMC 24 monitors information such as a voltage or a temperature of the server 200, and in which the BMC 24 shuts down the server 200 when the temperature of the server 200 rises due to some abnormality and there is a risk of firing. When the BMC 24 doing monitoring for safety aspects or the interface with the BMC 24 is blocked, absence of the hardware doing monitoring for safety aspects causes the server 200 to be liable to a safety unguaranteed state. To avoid such a status, it is desirable to shut down the node simultaneously with blocking either the BMC 24 or the interface with the BMC 24.

FIG. 7 shows a configuration of the hardware use table 314. The hardware use table 314 is a table that manages the uses of the hardware devices 10 on the server 200. The hardware use table 314 manages a hardware identifier 3140, a use 3141, and a hardware device name 3142 to be associated with one another.

The hardware identifier 3140 is an identifier with which the OS 100 or the storage program 220 (or BIOS) uniquely identifies one of the hardware devices 10 on the server 200. In the use 3141, information about the use or the type of the hardware device 10 such as the management interface that is an interface with the management system or the host interface that is an interface with a host computer may be stored. The hardware device name 3142 is an identifier that uniquely identifies the hardware device 10 and is a device name defined by the storage program 220.

FIG. 8 shows a configuration of the internal state table 326. The internal state table 326 is a table that manages a state of each hardware device 10, which is recognized by the storage program 220, on the server 200 within the storage program 220. The internal state table 326 manages a hardware device name 3260 and an internal state 3261 to be associated with each other.

For example, in an example of FIG. 8, the storage program 220 recognizes two host interfaces 20, manages one of the host interfaces 20 with an internal state thereof recognized as a normal state, which is a state in which the host interface 20 can be used in the I/O process. The internal state of the other host interface is an internally blocked state and the storage program 220 handles the internal state of the host interface 20 as an unusable state.

It is noted herein that the internal state that is the normal state or the internally blocked state often does not match a state of the actual hardware device 10 mounted in the server 200. For example, even if the state of the actual hardware device 10 is normal and yet the storage program 220 handles the state thereof as the internally blocked state, the hardware device 10 is not used in the I/O process by the storage program 220. Such state unmatching appears not only in the middle of the error handling in the present embodiment but also before start of the I/O process while the storage program 220 is being activated.

FIG. 9 shows a configuration of the interrupt management table 315. The interrupt management table 315 manages an interrupt vector number 3150 that indicates an interrupt type and an interrupt handler 3151 to be associated with each other. When receiving an interrupt, the processor 12 acquires the interrupt vector number 3150 that indicates a cause of occurrence of the interrupt from the hardware device 10 that causes the interrupt, and activates the interrupt handler 3151 associated with the interrupt vector number 3150. The interrupt handler 3151 is executed preferentially over normal processes by the OS 100. It is noted that the normal processes by the OS 100 are processes registered in the processing queue 312 and executed successively.

When a plurality of interrupt handlers 3151 are associated with the same interrupt vector number 3150, the associated interrupt handlers 3151 are executed in sequence. In an example of FIG. 9, the error identification section 211 that is the first interrupt handler and the error status determination section 212 that is the second interrupt handler are associated with an interrupt vector number 3150 "XX," and the error status determination section 212 is executed next to the error identification section 211.

Furthermore, before activation of the storage program 220, the error identification section 211 is registered as the interrupt handler 3151 in the interrupt management table 315. When the storage program 220 is activated, the process shown in FIG. 14 additionally registers the error status determination section 212 to the interrupt handler 3151.

FIG. 10 shows a configuration of the error occurrence information 311. The error occurrence information 311 manages an error occurrence location 3110 and an error content 3111 to be associated with each other. The hardware identifier of the hardware device 10 to which an error has occurred is stored in the error occurrence location 3110. In addition, the error type of the error that has occurred is stored in the error content.

FIG. 11 shows a configuration of the error history information 327. The error history information 327 is information that manages an error history 3271 of each hardware device 10. For example, the error history after activating the OS is recorded. The history of occurrences of errors to each hardware device 3270 to which errors occurred (error history 3271) is recorded in the error history information 327. For example, the number of occurrences of errors may be recorded per error type as the error history 3271.

FIG. 12 shows a configuration of the operation mode switch table 323. The operation mode switch table 323 stores the "I/O process" or a "failure process" as an operation mode of the storage program 220. When the operation mode is the "I/O process," the storage program 220 is in a state of executing the I/O processing section 221 and being capable of executing the I/O process. When the operation mode is the "failure process," the storage program 220 executes the storage-side error handling determination section 222, and determines the content of the error handling on the hardware device 10 to which an error has occurred.

FIG. 13 shows a configuration of the error log information 328. In the error log information 328, logs of a series of actions related to an error that has occurred are recorded in a log content 3281, and execution dates of the actions are recorded in a date 3280. As examples of the log content 3281, error notification reception by an interrupt, error detection by the device driver 214 by polling, execution of the reset process on the hardware device 10 by the OS 100 or the device driver 214 as a course of the recovery process against the error, successful recovery of the hardware device 10, and the like are recorded.

When the storage program 220 determines the error handling on one hardware device 10 and the OS 100 executes the error handling determined by the storage program 220 on the hardware device 10, the storage program 220 may record error logs. Contents of the error logs recorded by the storage program 220 may include a content related to recommended maintenance work. For example, when the hardware device 10 is blocked due to an error for which a hardware fault is suspected, replacement of the hardware is an example of the recommended maintenance work.

For example, when the storage-side error handling determination section 222 in the storage program 220 determines the blocking process on the hardware device 10 to which an error has occurred and the device driver 214 in the OS 100 executes the blocking process, logs are recorded to the effect that the blocking process is attributable to the storage program 220. Recording the logs to the effect that the blocking process is attributable to the storage program 220 can distinguish the error handling from the other error handling attributable to the OS and can facilitate error analysis.

The error log information 328 may be recorded by the error identification section 211 activated in response to an interrupt, the OS-side error handling section 213, or the device driver 214. Logs in a case in which the storage-side error handling determination section 222 determines the blocking process may be recorded by either the storage-side error handling determination section 222 or the device driver 214 that receives a blocking instruction.

The error log information 328 can be output to outside, for example, can be transmitted to the management device 40 or the like. For example, the error log information is displayed on a management screen of the management device 40, error analysis is performed on the basis of a content of the error log information, and maintenance work such as addition or replacement of the hardware device 10 can be conducted. Furthermore, it is desirable to store the error log information 328 not only in the memory 11 but also in a nonvolatile medium provided in the disk device 27 or the BMC 24 on a predetermined opportunity so that the error log information 328 can be protected. It is also desirable that the error log information 328 is described in a format in which a person can easily read the error log information 328.

Figure 14:
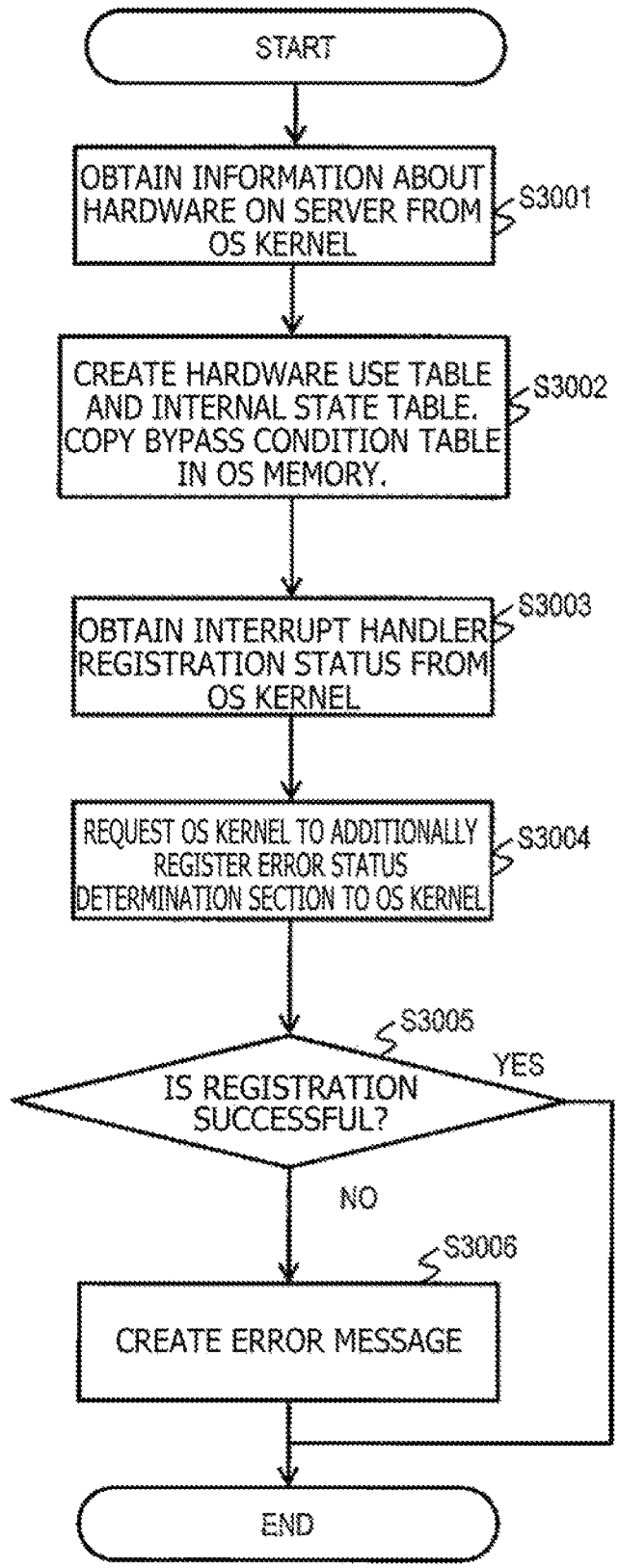
FIG. 14 is a flowchart of a process for adding an error status determination section to an OS kernel.

FIG. 14 is a flowchart of the process for adding the error status determination section 212 that is the interrupt handler to the OS kernel 210. In description with reference to FIG. 14, an entity that performs the process is the storage program 220 unless specified otherwise. The storage program 220 starts the process of FIG. 14 in a course of a process for activating the storage program 220 itself.

The storage program 220 obtains information about the hardware device 10 mounted in the server 200 from the OS kernel 210 (Step S3001). Examples of the information about the hardware device 10 include a model number, the number of CPU sockets, and the number of CPU cores of the processor (CPU) 12, a capacity and the number of mounted memory slots of the memory 11, and the number of PCI slots and types, vendor names, model numbers, bus numbers that are identification numbers in a PCI topology, device numbers, and function numbers of PCI devices actually mounted in the PCI slots. The OS kernel 210 normally recognizes this information about the hardware device 10 and the storage program 220 may obtain the same information. In the present embodiment, the storage program 220 acquires the hardware identifier of each hardware device 10 as the information about the hardware device 10.

Next, the storage program 220 creates the hardware use table 314. The storage program 220 records the hardware identifier acquired in S3001 in a column of the hardware identifier 3140 in the hardware use table 314. Furthermore, as for the use 3141 in the hardware use table 314, the storage program 220 may compare a hardware model number provided in the storage program 220 in advance with the hardware use table or the like, and record information indicating the use or the type of the hardware device 10. As for the hardware device name 3142 in the hardware use table 314, the storage program 220 defines and records a device name of the hardware device 10.

Furthermore, the storage program 220 creates the internal state table 326. The storage program 220 records the hardware device name 3142 of the hardware use table 314, in the hardware device name 3260 of the internal state table 326. Moreover, the storage program 220 records the internal state 3261 of the hardware device 10 identified by each hardware device name 3260.

Further, the storage program 220 copies the bypass condition table 324 in the OS memory 310 after recording the bypass condition table 324 in the application memory 320 (Step S3002). That is, the bypass condition table 324 of the same content is stored in both the OS memory 310 and the application memory 320. Storing the bypass condition table 324 in a memory space (OS memory 310) for the OS kernel 210 enables the error status determination section 212 operating as part of the OS kernel 210 to refer to the bypass condition table 324.

The storage program 220 secures an area in the application memory 320 for storing the error occurrence information 311 and the error history information 327. This area can be referred to by and subjected to storage and update of information not only by the storage program 220 but also by the OS 100. This area may be also used when the error status determination section 212 in the OS 100 notifies the storage-side error handling determination section 222 in the storage program 220 of an error. That is, the information such as the error occurrence information 311, the error history information 327, and the error logs may be communicated between the error status determination section 212 and the storage-side error handling determination section 222 using this area.

Next, the storage program 220 inquires of the OS kernel 210 about a registration status of the interrupt handler 211. The registration status is information about the interrupt vector number 3150 registered in the interrupt management table 315 and the interrupt handler 3151 corresponding to the interrupt vector number. This information is determined by the OS kernel 210 in a course of a process for activating the OS kernel 210 itself.

The OS kernel 210 responds to an inquiry about the registration status using the information in the interrupt management table 315. The storage program 220 acquires the information about the interrupt vector number 3150 and the interrupt handler 3151 corresponding to the interrupt vector number 3150 from the OS kernel 210 (Step S3003). The information acquired by the storage program 220 includes the information about the interrupt vector number 3150 used in the error interrupt from the hardware device 10 and about the error identification section 211 that is the first interrupt handler corresponding to the number.

Next, the storage program 220 requests the OS kernel 210 to additionally register the error status determination section 212 that is the second interrupt handler to the OS kernel 210. At this time, the storage program 220 needs to designate the interrupt vector number used in the error interrupt from the hardware device 10 on the basis of the information obtained in Step S3003 and to request the OS kernel 210 to register the error status determination section 212. This is because the error status determination section 212 to be additionally registered needs to share the same interrupt vector number with the error identification section 211 provided in the OS kernel 210 from the beginning (Step S3004).

Next, the storage program 220 determines whether a result of Step S3004 is a success. An example of a failure is a case in which the error identification section 211 does not permit the interrupt vector number to be shared (Step S3005).

When the determination result of Step S3005 is a failure, a flow goes to Step S3006. When the determination result is a success, the storage program 220 ends the process of FIG. 14. In the interrupt management table 315 at this time, the error identification section 211 and the error status determination section 212 are registered to correspond to the same interrupt vector number 3150, as shown in FIG. 9.

In Step S3006, since the registration of the error status determination section 212 fails at this time, the storage program 222 displays an error message to a management person and ends the process.

As described above, when performing the process for requesting the OS 100 to add the error status determination section 212 to the OS 100, the storage program 220 acquires first, from the OS 100, information about the error identification section 211 that is the interrupt handler executed by the processor 12 when the processor 12 receives the interrupt as the notification of the error in the hardware device 10. In addition, the storage program 220 requests the OS 100 to add the error status determination section 212 to the OS 100 so that the error status determination section 212 can be executed subsequently to the execution of the error identification section 211.

Figure 15:
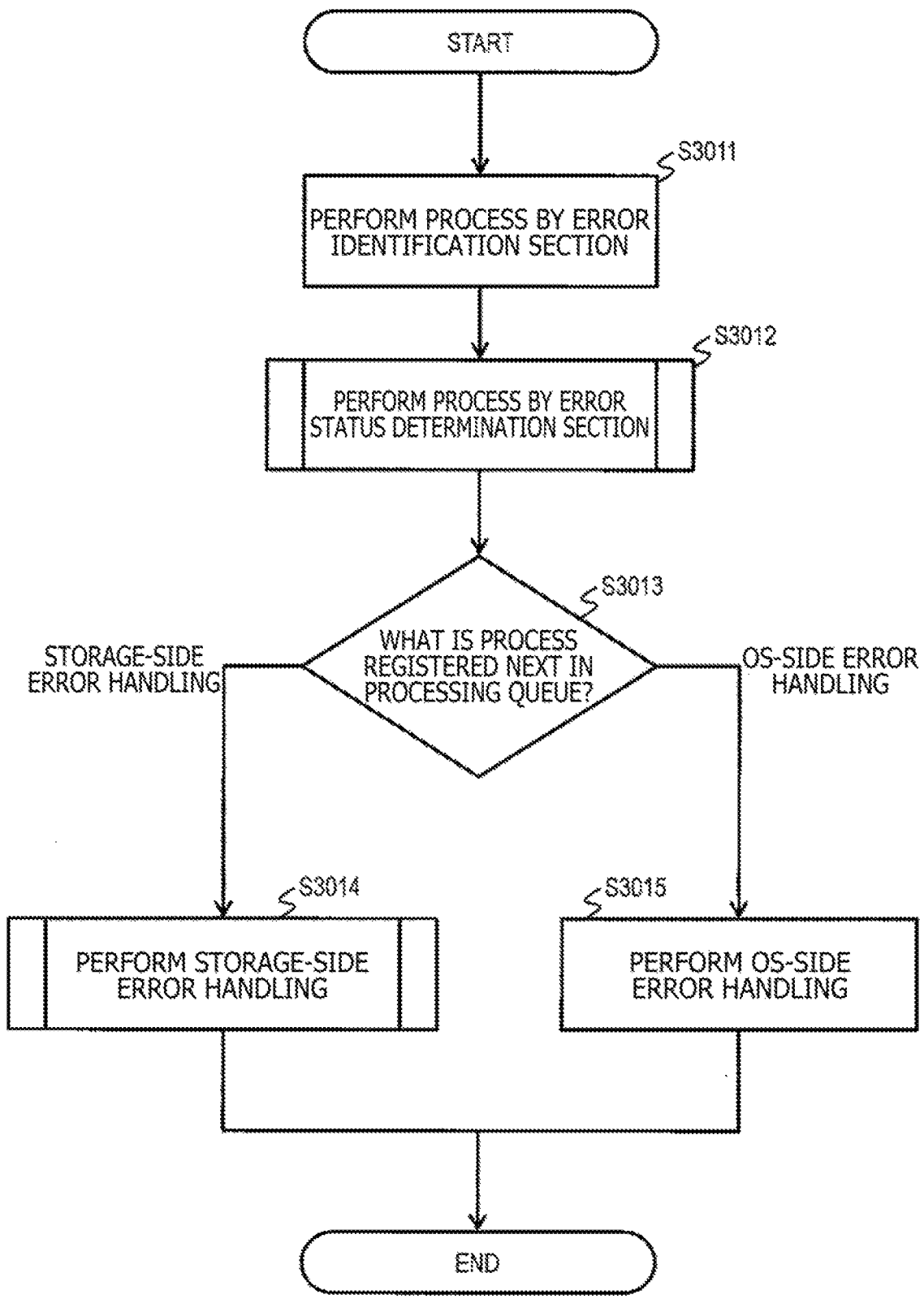
FIG. 15 is a flowchart of a series of error handling since occurrence of an error interrupt to a processor.

FIG. 15 is a flowchart of a series of error handling since occurrence of an error to one hardware device 10 in the server 200 and occurrence of an error interrupt to the processor 12. The handling of FIG. 15 is handling performed when the registration of the error status determination section 212 is successful in FIG. 14.

At a time of occurrence of an error to the hardware device 10 in the server 200 or detection of an error, an error interrupt is executed on the processor 12 from the hardware device 10 to notify the processor 12 of the error. When receiving the notification of the error that has occurred to the hardware device 10, the processor 12 acquires the interrupt vector number from the interrupt execution source.

The processor 12 executes the error identification section 211 that is the interrupt handler of the OS kernel 210 registered in the acquired interrupt vector number 3150 while referring to the interrupt management table 315.

The error identification section 211 identifies the error status of the hardware device 10. For example, the error identification section 211 identifies the hardware device (error occurrence location) to which the error has occurred and the error content while referring to an error register provided in the hardware device 10. The error identification section 211 stores, as the error occurrence information 311, the identified error occurrence location and the identified error content in the OS memory 310. The error identification section 211 then clears the error register provided in the hardware device 10.

The error identification section 211 updates the error history information 327 on the basis of the acquired error occurrence information and the acquired error content. At this time, the error identification section 211 may update the error history information 327 on the basis of a correspondence relationship between the hardware identifier 3140 and the hardware device name 3142 while referring to the hardware use table 314.

The error status may be any one of or both of the error occurrence information 311 and the updated error history information 327. The error status may be the error occurrence location, the error content, or the error history of the error occurrence location.

Furthermore, the error identification section 211 registers a content of the OS-side error handling to be executed later in the processing queue 312. As this content of the OS-side error handling, a content of the recovery process such as resetting the hardware device or a content of a process for activating the OS-side error handling section 213, for example, may be registered. The process described so far is Step S3011. It is noted that a specific process content of the error identification section 211 depends on implementation of the OS kernel 210; thus, the process performed by the error identification section 211 is not limited only to the above content.

Next, the processor 12 executes the error status determination section 212 while referring to the interrupt management table 315. In this respect, since the error status determination section 212 is registered in advance in such a manner that the error status determination section 212 shares the interrupt vector number with the error identification section 211, the error status determination section 212 is executed in succession after end of the process by the error identification section 211. A process content of the error status determination section 212 will be described with reference to FIG. 16.

When the additional registration of the error status determination section 212 fails in Step S3004 of FIG. 14, the error status determination section 212 is not executed; thus, processing returns to the OS kernel 210 after the end of the process by the error identification section 211.

After the error status determination section 212 ends Step S3012, the processing returns to the OS kernel 210 and the OS kernel 210 executes a next process while referring to the processing queue 312. At this time, the OS kernel 210 branches off a flow depending on a content of a process registered next in the processing queue 312 (Step S3013).

When the content is registered in the processing queue 312 as the storage-side error handling, the flow goes to Step S3014. When the content is registered in the processing queue 312 as the OS-side error handling, the flow goes to Step S3015. Details of Step S3014 will be described with reference to FIG. 17.

In Step S3015, the processor 12 executes the OS-side error handling section 213 to cause the OS-side error handling section 213 to carry out the OS-side error handling. The OS-side error handling means, for example, predetermined error handling provided in the OS kernel 210 on the basis of the error status identified by the error identification section 211 in Step S3011. Examples of the OS-side error handling include resetting an error occurrence region and reporting error occurrence to the management system. Not the error identification section 211 but the OS-side error handling section 213 may execute counting up the number of occurrences of errors recorded in the error history 3271 in the error history information 327. A process for directly operating the hardware device 10 such as the reset process on or stopping the error occurrence region may be executed via a processing interface provided by the device driver 214.

Figure 16:
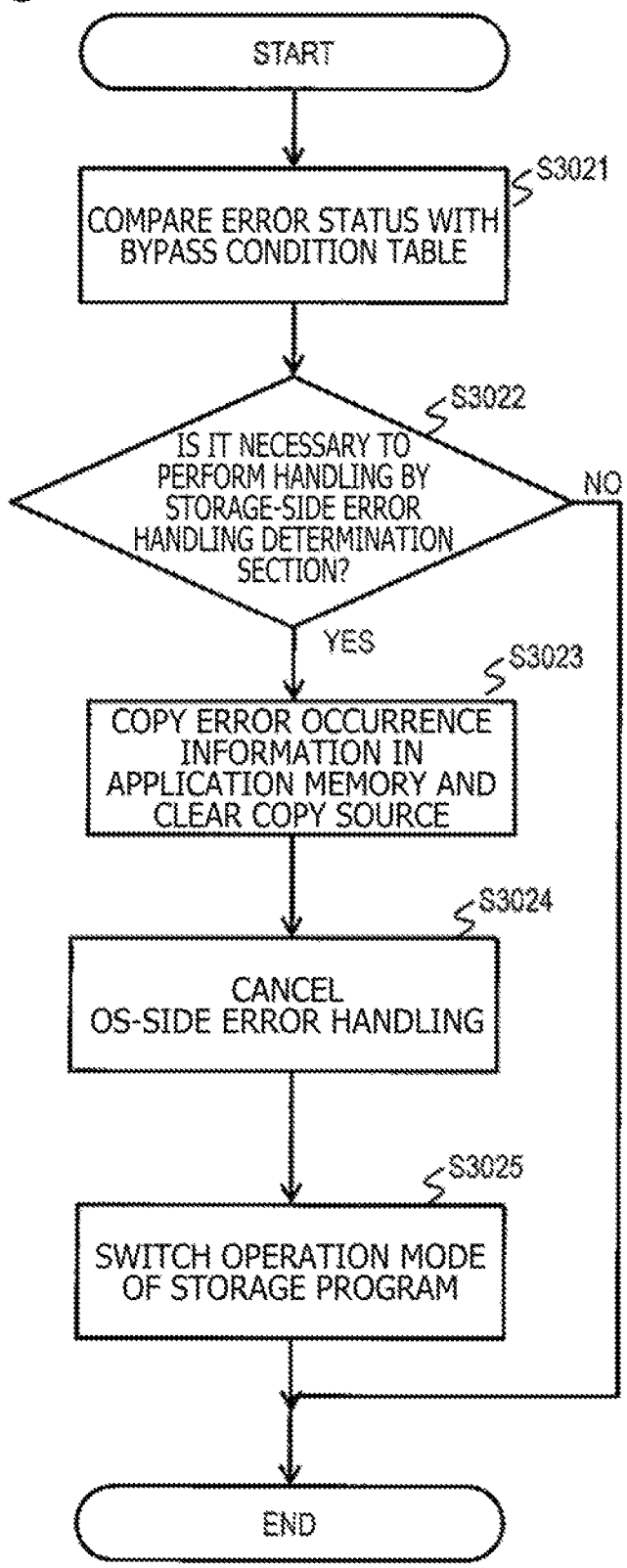
FIG. 16 is a flowchart of a process performed by the error status determination section.

FIG. 16 is a flowchart of the process performed by the error status determination section 212 in Step S3012 of FIG. 15. As described with reference to FIG. 14, the error status determination section 212 is the interrupt handler added to the OS 100 in response to the request from the storage program 220. The error status determination section 212 acquires the error occurrence information 311 stored by the error identification section 211 and the error history information 327 updated by the error identification section 211 in Step S3011 of FIG. 15 while referring to the OS memory 310. The error status determination section 212 then identifies the error status from the acquired information, compares the identified error status with the bypass condition in the bypass condition table 324 (Step S3021), and determines whether it is necessary to perform handling by the storage-side error handling determination section 222 (Step S3022).

A specific example of comparison is as follows. For example, when the hardware device 10 to which the error has occurred is the host interface 20 and the error type is Uncorrected Fatal, the error status matches the bypass condition in a column of the bypass condition table 324. Therefore, the error status determination section 212 determines that it is necessary to pass the handling to the storage-side error handling determination section 222.

Another example of comparison is as follows. When the hardware device 10 to which the error has occurred is the server-to-server interconnect 23 and the error type is Uncorrected Non-fatal and a fourth Uncorrected Non-Fatal error occurred to the hardware device 10, the error status determination section 212 determines that it is necessary to pass the handling to the storage-side error handling determination section 222.

Yet another example of comparison is as follows. When the hardware device 10 to which the error has occurred is the management interface 25, the error status determination section 212 determines that it is not necessary to pass the handling to the storage-side error handling determination section 222 irrespectively of the error content.

When a determination result of Step S3022 is YES, that is, it is necessary to perform the handling by the storage-side error handling determination section 222, a flow goes to Step S3023. When the determination result of Step S3022 is NO, that is, the OS-side error handling is performed, the error status determination section 212 ends the process of FIG. 16.

In Step S3023, the error status determination section 212 copies (stores) the error occurrence information 311 and the error history information 327 acquired from the OS memory 310 in the application memory 320, and deletes (erases) the error occurrence information 311 stored in the OS memory 310 after completing copying. This copying process is necessary for identifying the error status when the storage-side error handling determination section 222 in the storage program 220 performs the handling. In addition, a process for deleting the error occurrence information 311 is necessary for preventing the OS kernel 210 from performing an illegal process in subsequent processes. That is, not leaving the error occurrence information 311 in the OS memory 310 can prevent the OS-side error handling from being executed later, and storing the error occurrence information 311 in the application memory 320 enables the storage-side error handling of FIG. 17.

Next, the error status determination section 212 cancels the OS-side error handling registered in the processing queue 312 in Step S3024. Specifically, the error status determination section 212 erases the OS-side error handling registered in Step S3011 of FIG. 15 from the processing queue 312 to prevent execution of the OS-side error handling. This is necessary for preventing the OS kernel 210 from performing the illegal process in the subsequent processes. In other words, cancelling the OS-side error handling prevents a conflict between the storage-side error handling of FIG. 17 and the OS-side error handling. For example, cancelling the OS-side error handling prevents a situation in which the blocking process on the hardware device 10 to which the error has occurred is determined and executed as the storage-side error handling while the recovery process is executed on the same hardware device 10 or the blocking process, which overlaps the storage-side error handling, is executed on the hardware device 10 as the OS-side error handling. Such a conflict possibly triggers inadvertent operation by the hardware device 10. The hardware device 10 possibly falls into an unrecoverable state by causing the hardware device 10 to operate inadvertently despite the recoverable error; thus, the conflict should be avoided.

In Step S3025, the error status determination section 212 performs an operation mode switch process for causing the storage program 220 to execute the storage-side error handling determination section 222. When the storage program 220 is, for example, in a form of the user process that operates on the OS kernel 210, the error status determination section 212 may perform the switch process in such a manner as to send a signal to the storage program 220 that is the user process. Upon receiving the signal, the storage program 220 switches an operation mode thereof from the I/O process to the failure process. This switch process can switch over next operation by the storage program 220 from the I/O process to the failure process by allowing a signal handler in the storage program 220 to, for example, write predetermined information (for example, the failure process) to the operation mode switch table 323.

Figure 17:
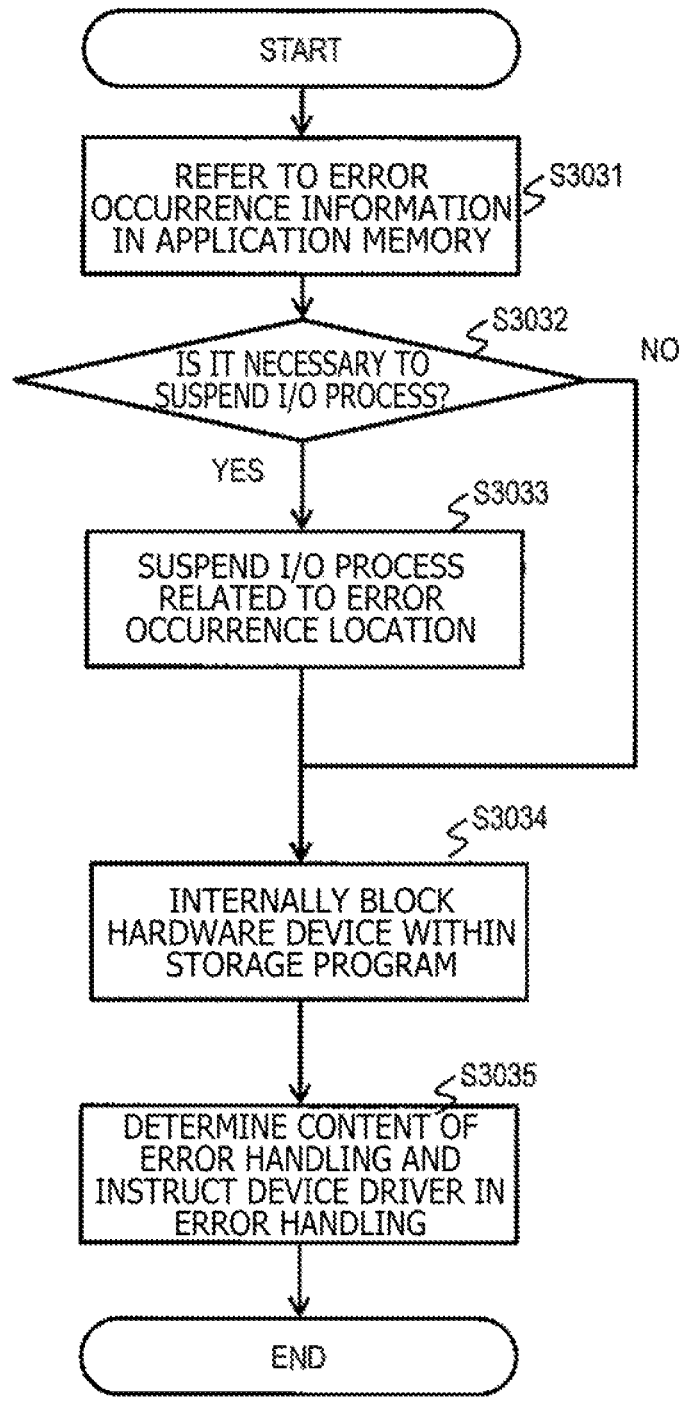
FIG. 17 is a flowchart of a process performed by a storage-side error handling determination section.

FIG. 16 is a flowchart of the process performed by the storage-side error handling determination section 222 in the storage program 220. The process of FIG. 17 is started at time at which the storage program 220 the operation mode of which is switched in the process of FIG. 17 causes the storage-side error handling determination section 222 to start operating.

When the storage program 220 is in such a form as the user process operating on the OS kernel 210, the handling is not immediately passed to the storage program 220 from the error identification section 211 or the error status determination section 212 that is the interrupt handler but the storage program 220 starts the handling via a process scheduling process by the OS kernel 210.

The storage-side error handling determination section 222 acquires the error occurrence location and the error content while referring to the error occurrence information 311 in the application memory 320 (Step S3031). The storage-side error handling determination section 222 performs the following processes including a process for determining the error handling on the hardware device on the basis of the error occurrence information 311 in the application memory 320. In the present embodiment, the storage-side error handling determination section 222 determines to perform the blocking process on the hardware device 10 to which the error has occurred.

Next, the storage-side error handling determination section 222 determines whether it is necessary to suspend the I/O process. For example, when the error occurrence region is a portion related to the I/O process, there is a risk that the I/O process using the error occurrence location results in data destruction; thus, it is desirable to exercise control such that the I/O process is suspended and then resumed after recovery from the error. In Step S3032, therefore, when the hardware device 10 that is the error occurrence location is the region related to the I/O process such as the host interface 20, the disk interface 21, or the server-to-server interconnect 23, the storage-side error handling determination section 222 determines that it is necessary to suspend the I/O process using the error occurrence location (Step S3032).

When a determination result of Step S3032 is YES, that is, the storage-side error handling determination section 222 determines that it is necessary to suspend the I/O process, a flow goes to Step S3033. When the determination result of Step S3032 is NO, that is, the storage-side error handling determination section 222 determines that it is not necessary to suspend the I/O process, the flow goes to Step S3034.

In Step S3033, the storage-side error handling determination section 222 identifies the hardware device 10 (error occurrence location) to which the error has occurred while referring to the error occurrence information 311 in the application memory 320, and suspends the I/O process using the identified hardware device 10. When suspending the I/O process, the storage-side error handling determination section 222 abandons a request of the I/O process using the hardware device 10 to which the error has occurred (for example, the disk interface, the host interface, or the server-to-server interconnect). Furthermore, the storage-side error handling determination section 222 may re-queue the I/O process in a retransmission processing queue provided in the storage program 220 for retransmitting the abandoned request of the I/O process as needed.

In Step S3034, the storage-side error handling determination section 222 stops subsequent use of the hardware device 10 to which the error has occurred within the storage program 220. Specifically, the storage-side error handling determination section 222 updates the internal state 3261 of the hardware device 10 to an internally blocked state in the internal state table 326. After determining the blocking process as the error handling on the hardware device 10, the storage-side error handling determination section 222 stops using the hardware device 10 to which the error has occurred in the I/O process by the storage program 220 through S3033 and S3034. After the use of the hardware device 10 is stopped, the OS 100 executes the blocking process on the hardware device 10 as described later. It is noted that the hardware device 10 to which the error has occurred is not in a stopped state until the OS 100 executes the blocking process on the hardware device 10 after the use of the hardware device 10 in the I/O process by the storage program 220 is stopped.

In Step S3035, the storage-side error handling determination section 222 determines the content of the error handling and instructs the device driver 214 in the content of the error handling. As described above, in the present embodiment, the storage-side error handling determination section 222 determines to perform the blocking process on the hardware device 10 to which the error has occurred. Alternatively, the storage-side error handling determination section 222 may identify the error status while referring to the error occurrence information 311 and the error history information 327 in the application memory 320, and may determine the error handling other than the blocking process depending on the error status.

The storage-side error handling determination section 222 determines whether it is necessary to execute the blocking-time additional action from the use or the type of the hardware device 10 subjected to the blocking process while referring to the blocking action table 325. According to an example of the blocking action table 325 of FIG. 6, the storage-side error handling determination section 222 determines that the blocking-time additional action is not necessary when the hardware device 10 subjected to the blocking process is the host interface; however, the storage-side error handling determination section 222 determines a process for stopping the node as a content of an additional error handling when the hardware device 10 is the BMC.

After determining the content of the error handling, the storage-side error handling determination section 222 instructs the device driver 214 to perform the blocking process as the error handling. Upon receiving an instruction of the blocking process, the device driver 214 performs the blocking process on the hardware device 10 and stops the hardware device 10 using a hardware operation interface provided by the device driver 214.

Finally, the storage-side error handling determination section 222 performs an operation mode switch process for causing the storage program 220 to execute the I/O processing section 221. The storage program 220 switches the operation mode from the failure process to the I/O process. This switch process can switch over next operation by the storage program 220 from the failure process to the I/O process by allowing the storage program 220 to, for example, write predetermined information (for example, the I/O process) to the operation mode switch table 323.

Figure 18:
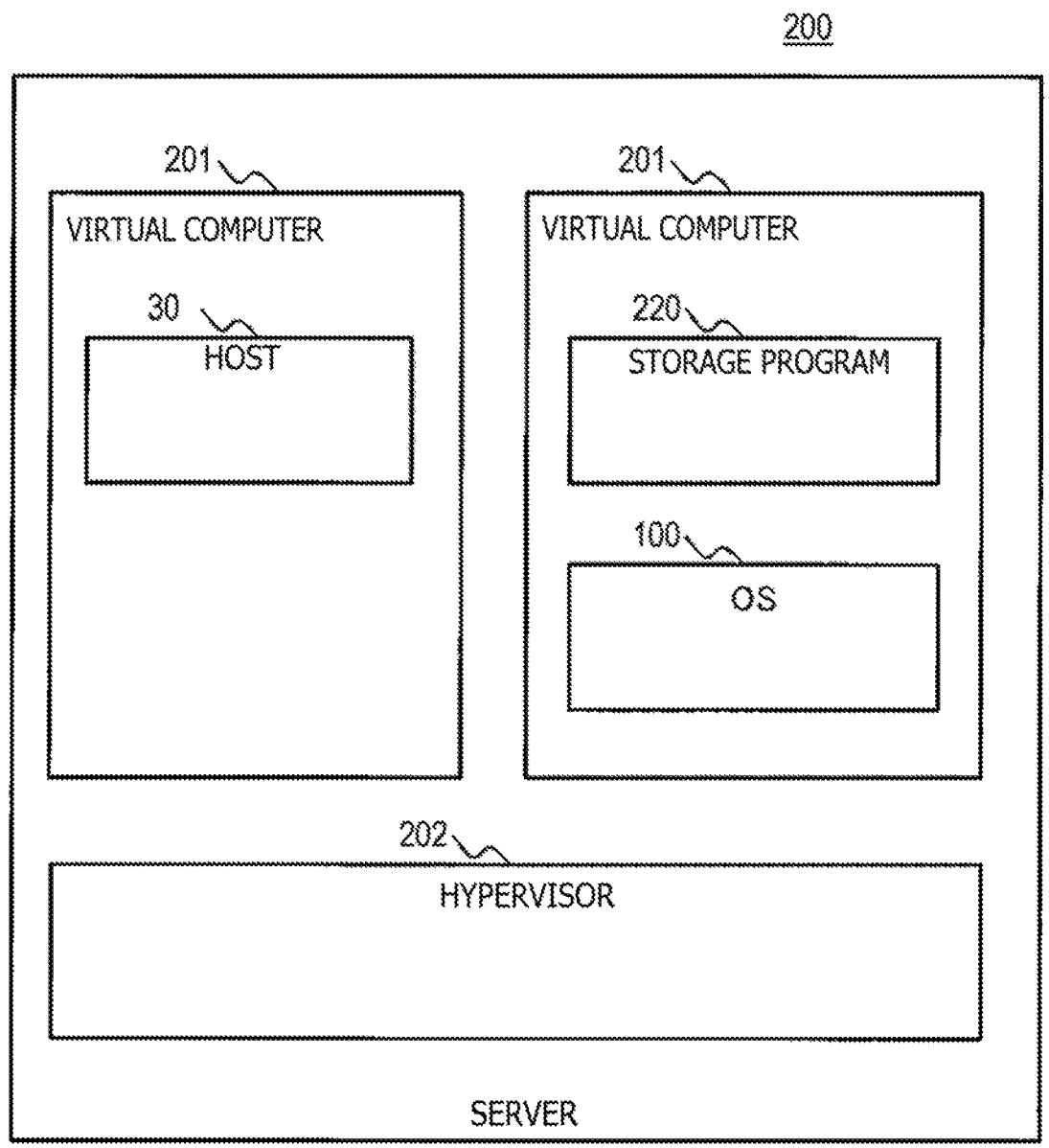
FIG. 18 shows another example of the configuration of the computing system.

FIG. 18 shows another example of the configuration of the computing system 50. As shown in FIG. 18, a hypervisor 202 may operate on the server 200 and one or a plurality of virtual computers 201 may run on the hypervisor 202. The OS 100 and the storage program 220 may operate on one of the virtual computers 201. That is, the OS 100 and the storage program 220 operate on hardware of a physical computer in some cases and operate on the virtual computer in other cases.

Furthermore, the host 30 may be a host program operating on one of the virtual computers 201 or may be a physical host computer. The virtual computer 201 on which the OS 100 and the storage program 220 operate and the virtual computer 201 on which the host program operates may be either on the same server 200 or on different servers 200 connected to each other via the network 60.

Moreover, when the computing system 50 has a plurality of servers, part of the servers may be located in different sites. Furthermore, part of or entirety of the servers 200 of the computing system 50 may be located on a cloud and provide services to a user via the network 60.

The present invention is applicable even to such an example of the configuration. Generally, the virtual computer 201 runs on virtual hardware resources provided by the hypervisor 202 and adopts a form of accessing the hardware resources via the hypervisor 202. However, the virtual computer 201 is often capable of directly accessing the hardware resources, depending on a function provided in the hypervisor 202. This is a so-called passthrough technique. When this passthrough technique is employed and an error occurred to the hardware device 10, the OS 100 included in the virtual computer 201 is notified of the error. Subsequently, it is possible to execute the processes shown in FIGS. 15 to 17 and characteristic of the present invention.

In the present embodiment, various information is often described while being expressed as, for example, "xxx table"; alternatively, the various information may be expressed in a data structure other than a table structure. The "xxx table" is often referred to as "xxx information" for indicating that the various information does not rely on the data structure.

In the present embodiment, the process is often described with "program" assumed as a subject. However, since the program performs a specified process while appropriately using storage resources (for example, the memory) and/or a communication interface device (for example, a communication port) by allowing the processor (for example, a CPU (Central Processing Unit)) to execute the process, the subject that performs the process may be the processor. The processor operates as a functional section that realizes a predetermined function by operating in accordance with the program. A device and a system each including the processor is the device and the system each including the functional section.

The process described with the program or the processor assumed as the subject can be described while a computer (for example, a storage system, a management computer, a client or a host) is assumed as the subject. The processor may include a hardware circuit that performs part of or entirety of processes performed by the processor. The computer program may be installed into each computer from a program source. The program source may be, for example, a program distribution server (for example, the management computer) or a storage media.

While the embodiment of the present invention has been described, the description is exemplarily given and does not intend to limit a scope of the present invention to the configurations described above. The present invention can be implemented in various other forms. The present invention is applicable to an information processing system such as a general-purpose computer or a server, a storage device such as a storage system, or the like.

DESCRIPTION OF REFERENCE CHARACTERS

10: Hardware device
11: Memory
12: Processor
30: Host
40: Management device
50: Computing system 60: Network
100: Operating system (OS)
200: Server
210: OS kernel
211: Error identification section
212: Error status determination section
213: OS-side error handling section
214: Device driver
220: Storage program
222: Storage-side error handling determination section
311: Error occurrence information
314: Hardware use table
315: Interrupt management table
323: Operation mode switch table
324: Bypass condition table
325: Blocking action table
326: Internal state table
327: Error history information
328: Error log information

The invention claimed is:

1. A computing system comprising:
a processor that executes an operating system controlling a hardware device and a storage program operating on the operating system and using the hardware device via the operating system; and
a memory that records condition management information managing a predetermined condition on which the storage program determines error handling on the hardware device,
wherein upon the operating system receiving a notification of an error that occurred in the hardware device, the operating system determines to execute a recovery processing to the hardware device and executes the recovery processing to the hardware device,
wherein the storage program sets an interrupt handler in the operating system,
wherein the interrupt handler identifies an error status of the hardware device and upon determining the error status satisfies a predetermined condition, the operating system notifies the error status to the storage program running on the operating system without performing the recovery processing,
wherein the storage program that receives a notice of the error status requests the operating system to perform hardware device processing,
wherein the operating system performs to shutdown processing of the hardware device,
wherein the memory has a queue that manages processes planned to be executed by the operating system,
wherein the operating system has, as interrupt handlers, a first interrupt handler and a second interrupt handler added in response to a request from the storage program,
wherein the processor executes the first interrupt handler when receiving an interrupt as the notification of the error,
wherein the first interrupt handler registers error handling by the operating system in the queue,
wherein the processor executes the second interrupt handler after executing the first interrupt handler, and
wherein the second interrupt handler determines whether the error status satisfies the predetermined condition while referring to the condition management information, and cancels the error handling by the operating system registered in the queue when the error status satisfies the predetermined condition.

2. The computing system according to claim 1, wherein the condition management information manager, as the predetermined condition, a threshold for a number of occurrences of errors for every error type of the error that has occurred to the hardware device.

3. The computing system according to claim 1, wherein
the error status satisfies the predetermined condition at a time of occurrence of an Uncorrectable and Fatal error to the hardware device used in an I/O process executed by the storage program, and
the error handling determined by the storage program is the blocking process on the hardware device used in the I/O process.

4. The computing system according to claim 1, wherein
the storage program stops using the hardware device in an I/O process by the storage program after determining a blocking process as the error handling on the hardware device, and
the operating system executes the blocking process on the hardware device after the storage program stops using the hardware device.

5. The computing system according to claim 1, wherein
when the storage program determines the error handling on the hardware device, and
when the operating system executes the error handling determined by the storage program on the hardware device,
the storage program records an error log.

6. An error handling method for a computing system that executes an operating system controlling a hardware device and a storage program operating on the operating system and using the hardware device via the operating system, wherein
the computing system includes a memory that has a first memory area referred to by the operating system and a second memory area referred to by the storage program, has a queue that manages processes planned to be executed by the operating system, and manages a predetermined condition on which the storage program determines error handling on the hardware device, and
the operating system has, as interrupt handlers, a first interrupt handler and a second interrupt handler added in response to a request from the storage program,
the error handling method comprising:
causing the first interrupt handler of the operating system to identify an error status of the hardware device when the first interrupt handler receives a notification of an error that has occurred to the hardware device, and to register error handling by the operating system in the queue when the error status satisfies the predetermined condition;
causing the first interrupt handler to store information about the hardware device to which the error has occurred and about an error content in the first memory area as error occurrence information identified as at least part of the error status;
causing the second interrupt handler added in response to the request from the storage program to determine whether the error status satisfies the predetermined condition after the first interrupt handler registers the error handling by the operating system in the queue, and to cancel the error handling by the operating system registered in the queue when the error status satisfies the predetermined condition;
causing the second interrupt handler to acquire the error occurrence information while referring to the first memory area, to store the error occurrence information in the second memory area referred to by the storage program, and to delete the error occurrence information in the first memory area;

causing the storage program to determine the error handling on the hardware device on the basis of the error occurrence information in the second memory area and requests the operating system to perform the determined error handling; and causing the operating system to perform the determined error handling on the hardware device.

7. The computing system according to claim 1, wherein the memory has a first memory area referred to by the operating system and a second memory area referred to by the storage program, the first interrupt handler of the operating system identifies the hardware device to which the error has occurred and an error content, and stores the identified hardware device and the identified error content in the first memory area as error occurrence information, the second interrupt handler added in response to the request from the storage program acquires the error occurrence information while referring to the first memory area, stores the error occurrence information in the second memory area referred to by the storage program, and deletes the error occurrence information in the first memory area, and the storage program determines the error handling on the hardware device on the basis of the error occurrence information in the second memory area.

8. The computing system according to claim 7, wherein the storage program identifies the hardware device to which the error has occurred while referring to the error occurrence information in the second memory area, and suspends an I/O process using the identified hardware device.

9. The computing system according to claim 8, wherein the storage program abandons a request of the I/O process using the identified hardware device when suspending the I/O process.

10. The computing system according to claim 9, wherein the storage program, as a process for requesting the operating system to add the second interrupt handler to the operating system, acquires information about the first interrupt handler that is the interrupt handler executed when the processor receives, from the operating system, an interrupt as the notification of the error, and requests the operating system to add the second interrupt handler to the operating system so that the second interrupt handler is executed subsequently to execution of the first interrupt handler.

* * * * *